Aug. 24, 1943.   D. M. MORRIS   2,327,923
FEED CUP FOR GRAIN DRILLS
Filed March 10, 1941

Inventor
David M. Morris
By Paul O. Pippel
Att'y

Patented Aug. 24, 1943

2,327,923

UNITED STATES PATENT OFFICE 2,327,923

FEED CUP FOR GRAIN DRILLS

David M. Morris, Richmond, Ind., assignor to International Harvester Company, a corporation of New Jersey Application March 10, 1941, Serial No. 382,567

1 Claim. (Cl. 221—139)

The present invention relates to a feed cup for a grain drill.

The usual feed cup for a grain drill comprises two feed cup members secured to one another with a feed wheel rotatably mounted between them so that spaces of different sizes are enclosed on opposite sides of the feed wheel, one spacing being of relatively smaller size for small seeds and the other space being relatively large for large seeds. In each case the space enclosed between the feed wheel and a cup member decreases in cross-sectional area toward a point from which seed is discharged into a seed tube. In the case of larger seeds it frequently happens that there is a wedging action because of the decrease in cross-sectional area, and consequently there may be a stopping of passage of seeds and a cracking of the seed. The cracking may also be due to a too agressive action of the ribs of the feed wheel.

An object of the present invention is to provide an improved feed cup for a grain drill.

Another object is to provide an improved feed cup in which the wedging of the seeds is prevented.

A further object is to provide an improved feed wheel for a feed cup for grain drills.

Still another object is the provision of a feed wheel which has a less aggressive action upon the seed.

According to the present invention, two feed cup members are secured to one another on opposite sides of a feed wheel so that large and small spaces are enclosed for the feeding of large and small seeds. A shoulder is provided in the feed cup member which with the feed wheel, encloses the space for large seeds so that the wedging of the seeds is prevented. The feed wheel has ribs, each of which has one side provided with a steep slope and the other side, with a comparatively gentle or flat slope.

Figure 1:
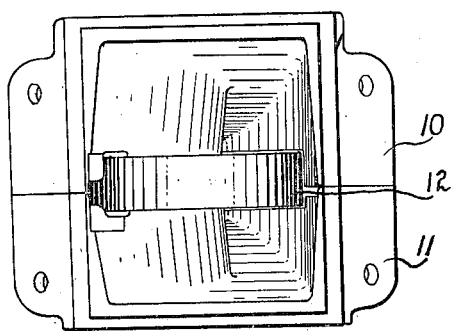
Figure 1 is a plan view of the feed cup of the present invention.
Figure 2:
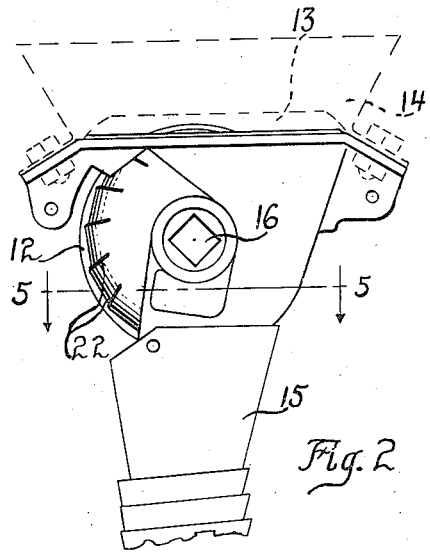
Figure 2 is a side view of the feed cup showing its use with a grain box and a feed tube.

As seen in Figure 1, the feed cup of the present invention comprises a large feed cup member 10 and a small feed cup member 11 secured together. A feed cup wheel 12 is rotatably mounted on and between the members 10 and 11. A bridge 13 is positioned over the feed wheel. As seen in Figure 2, the feed cup has a grain box 14 secured to the top and a flexible feed tube 15 extending from the bottom. In operation, the feed wheel 12 is rotated by means of a shaft, not shown, fitting within the rectangular opening 16 in the wheel. Rotation of the wheel causes seed to be passed from the box 14 through the space enclosed between the one of the members 10 and 11, not covered, and passed outwardly into the tube 15 which passes to a drill, not shown. The small feed cup member 11 is used for the passage of relatively small seeds, and since it is shaped in the usual manner, it need be described only to the extent of stating that the space enclosed between the member 11 and the feed wheel 12 is of progressively decreasing cross-sectional area in a direction toward the discharge point.

Figure 3:
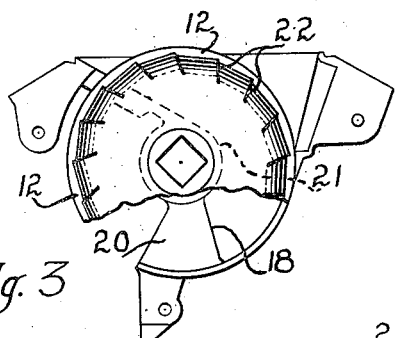
Figure 3 is a side view showing the novel feed cup member with the feed wheel mounted therein, a portion of the feed wheel being broken away.
Figure 5:
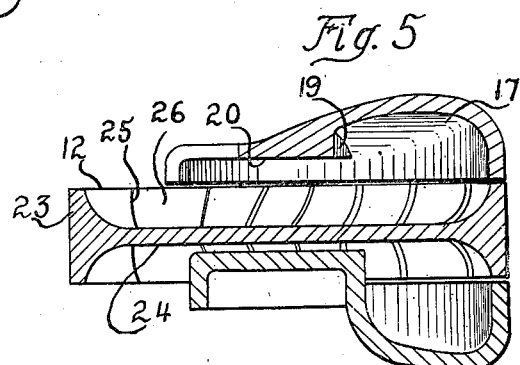
Figure 5 is a sectional view taken along the line 5—5 of Figure 2.
Figure 4:
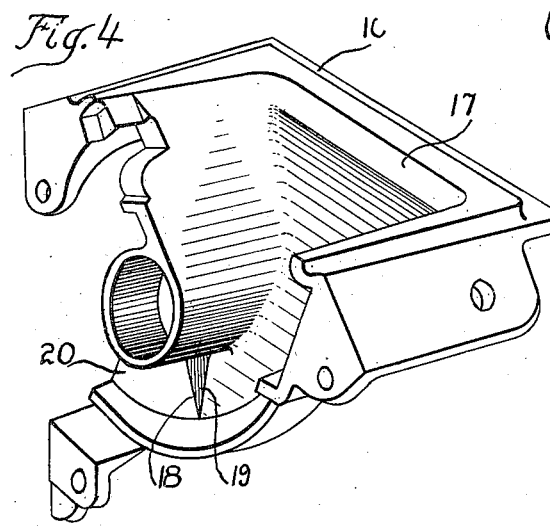
Figure 4 is a perspective view of the novel feed cup member.

As is to be seen from the perspective view of Figure 4, the novel feed cup member 10 has a surface 17 extending toward the plane of the feed wheel 12 at an acute angle with respect thereto. At the lower end of the surface 17 is a shoulder 18 which has a surface 19 extending generally at right angles to the plane of the feed wheel 12. Beyond the shoulder 18 is a surface 20 which is generally parallel or at a slight angle to the plane of the feed wheel. As is to be seen from Figure 3, the width of the surface 17 is substantially constant below a point 21 and is the same as the width of the shoulder 18 and the surface 20. Accordingly, the cross-sectional area of the space, enclosed between the feed wheel 12 and the cup member 10 below the point 21, decreases gradually in a direction toward the discharge point and then decreases abruptly at the shoulder 18 to an area which remains generally constant or only slightly increases over the surface 20 from the shoulder to the discharge point. By virtue of the abrupt change in cross-sectional area, due to the shoulder 18, a jamming of the seeds is prevented, which jamming heretofore occurred with the use of a space simply gradually decreasing in cross-sectional area throughout its entire length.

Figure 6:
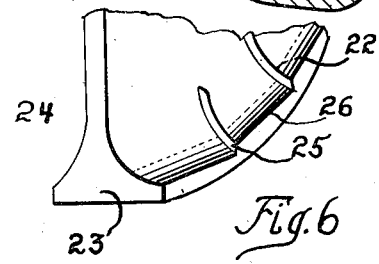
Figure 6 is a detail view showing the ribs of the feed wheel on an enlarged scale.

The feeding action of the feed wheel 12 is caused by ribs 22 thereon. These ribs curve, although they extend generally in a direction radially from the center of the wheel along opposite sides of the wheel on surfaces forming a smooth curve and joining the inner sides of a peripheral flange 23 with the adjoining web portion 24 of the feed wheel. As seen in Figure 6, each rib 22 has a relatively steeply sloping side 25 and a relatively gently sloping side 26. By virtue of the relatively gentle slope on the side 26, which is incidentally the advancing side, the feed wheel has a less aggressive action upon the seeds, which permits them readily to adjust themselves to each other and to the channel, and this aids in maintaining uniform delivery.

It will be apparent from the foregoing description that a new and novel feed construction has been provided, which construction involves a feed wheel of improved rib conformation resulting in gentler feed of seeds, and also a feed cup member provided with a shoulder which provides an abrupt reduction in the cross-sectional area of the space between the feed wheel and the cup member and, consequently, elimination of the jamming or wedging of large seeds in the feed cup.

The intention is to limit the invention only within the terms of the appended claim.

What is claimed is:

In combination, a feed wheel, and a cup member supporting the feed wheel for rotation and being recessed to form with the feed wheel an enclosed space decreasing in cross-sectional area toward a discharge point, the member having a surface in the recess extending toward the plane of the feed wheel at an acute angle with respect thereto, then in a plane at right angles to the plane of the feed wheel, and finally generally parallel to the plane of the feed wheel.

DAVID M. MORRIS.